UNITED STATES PATENT OFFICE.

JOHN C. MARTIN, OF RICHMOND, COUNTY OF SURREY, ENGLAND.

MANUFACTURE OF WHITE LEAD.

SPECIFICATION forming part of Letters Patent No. 290,444, dated December 18, 1883.

Application filed July 12, 1882. (No specimens.) Patented in England March 18, 1879, No. 1,054; in France September 18, 1879, No. 132,767; in Germany September 21, 1879, No. 10,209, and in Belgium September 26, 1879, No. 49,401.

*To all whom it may concern:*

Be it known that I, JOHN COWDERY MARTIN, a subject of the Queen of Great Britain, and residing at Richmond, in the county of Surrey and Kingdom of Great Britain, have invented a certain new and useful Improvement in the Manufacture of White Lead, (for which I have obtained Letters Patent in Great Britain, dated March 18, 1879, No. 1,054; in France, dated September 18, 1879, No. 132,767; in Belgium, dated September 26, 1879, No. 49,401, and in Germany, dated September 21, 1879, No. 10,209;) and I do hereby declare that the following is a full, clear, and exact description of the invention, which will enable others skilled in the art to which it appertains to make and use the same.

This improvement is founded upon that described in the specification of former Letters Patent granted to me in England, and dated the 4th day of April, A. D. 1877, No. 1,300; and it consists in mixing hydrated oxide of lead, or the suboxide of lead, or the oxide produced by combination with the lesser proportions of oxygen and formed at low temperatures, with white lead precipitated from a solution of lead-salt by carbonic-acid gas, or that is produced by other means. I mix this hydrated oxide or suboxide of lead, as the case may be, with the white lead while the latter is wet, and I grind or crush this mixture when dry, adding or not, as may be necessary, a further proportion of oxide during the grinding operation.

The object of this mixture of oxide of lead with white lead is to increase the specific gravity or density of the white lead, and to improve its quality as a paint, as described in my specification of my aforesaid Patent No. 1,300; but the distinctive feature of this invention consists in effecting the mixture while the white lead is in the wet state; and I find it advantageous to add the oxide of lead while there still remains a small proportion of the lead solution, as by that means the white lead resulting is in some cases of a smoother quality that when water only is present, whereas by the process described in the specification of the aforesaid Patent No. 1,300 the mixture is effected after the white lead has been dried. By effecting the mixture while the white lead is wet, I have found that better results are obtained than when the mixture is effected in the dry state.

The hydrated oxide of lead may be made as described in the specification of the aforesaid Patent No. 1,300—that is to say, by the abrasion of granulated metallic lead exposed to the action of water and of the atmosphere and the suboxide of lead by gently heating white lead in a closed retort; and those are the best means with which I am acquainted for producing those substances, but they may be produced by other means, if preferred.

I claim—

The method of combining hydrated oxide of lead or the suboxide of lead with white lead which requires to be improved in quality as a paint, by mixing the said hydrated or suboxide of lead with the white lead while in a wet condition, and subsequently grinding or crushing the mixture when in a dry condition, as hereinbefore described, and for the purpose set forth.

J. C. MARTIN.

Witnesses:
W. H. BECK,
S. E. GUNYON.